United States Patent
Hurst et al.

(10) Patent No.: US 10,332,095 B2
(45) Date of Patent: Jun. 25, 2019

(54) GENERATION AND EXCHANGE OF CUSTOM SELF-RECORDED MULTIMEDIA

(71) Applicant: CELEBVIDY, LLC, Las Vegas, NV (US)

(72) Inventors: Austin Hurst, Las Vegas, NV (US); Zach Hurst, Las Vegas, NV (US); Dan Fleyshman, Los Angeles, CA (US)

(73) Assignee: CELEBVIDY, LLC, Las Vegas, NV (US)

( * ) Notice: Subject to any disclaimer, the term of this patent is extended or adjusted under 35 U.S.C. 154(b) by 0 days.

(21) Appl. No.: 14/707,777

(22) Filed: May 8, 2015

(65) Prior Publication Data

US 2015/0324886 A1    Nov. 12, 2015

Related U.S. Application Data

(60) Provisional application No. 61/991,151, filed on May 9, 2014.

(51) Int. Cl.
*G06Q 30/00* (2012.01)
*G06Q 20/32* (2012.01)
(Continued)

(52) U.S. Cl.
CPC .......... *G06Q 20/32* (2013.01); *G06Q 20/123* (2013.01); *G06Q 20/22* (2013.01);
(Continued)

(58) Field of Classification Search
CPC .............. G06Q 30/00; G06Q 30/0601; G06Q 30/0603; G06Q 30/0621; G06Q 30/0641;
(Continued)

(56) References Cited

U.S. PATENT DOCUMENTS

| 7,697,713 B1* | 4/2010 | Verhoeven | G06T 11/00 |
| | | | 382/100 |
| 2002/0007493 A1* | 1/2002 | Butler | H04N 5/44543 |
| | | | 725/109 |

(Continued)

OTHER PUBLICATIONS

Beißwenger, Michael, and Angelika Storrer. "21. Corpora of Computer-Mediated Communication." Corpus Linguistics. An International Handbook. Series: Handbücher zur Sprach-und Kommunikationswissenschaft/Handbooks of Linguistics and Communication Science. Mouton de Gruyter, Berlin (2008). (Year: 2008).*

(Continued)

*Primary Examiner* — Christopher B Seibert
(74) *Attorney, Agent, or Firm* — Shook, Hardy & Bacon, L.L.P.

(57) ABSTRACT

In various implementations, a computing device is configured to facilitate the exchange and delivery of custom self-recorded media. In some implementations, service subject profiles are presented for display as an offer for exchanging a self-recorded media produced by the service subject for an electronic payment made by a consumer. Receipt of a selected service subject, payment information, and a consumer-provided expression serves as an acceptance of the offer for exchange, which in turn, notifies the service subject and further provides the service subject an interface for generating the self-recorded media employing their computing device's media generating hardware. Requests for custom self-recorded media and the custom self-recorded media generated as a result of the requests are managed and exchanged by way of the computing device.

20 Claims, 16 Drawing Sheets

(51) Int. Cl.
*G06Q 30/06* (2012.01)
*G06Q 20/12* (2012.01)
*G06Q 50/00* (2012.01)
*G06Q 20/22* (2012.01)

(52) U.S. Cl.
CPC ..... *G06Q 30/0621* (2013.01); *G06Q 30/0641* (2013.01); *G06Q 50/01* (2013.01); *G06Q 30/06* (2013.01); *G06Q 50/00* (2013.01)

(58) Field of Classification Search
CPC ......... G06Q 50/01; G06F 15/16; G06F 17/00; G06F 3/00
See application file for complete search history.

(56) References Cited

U.S. PATENT DOCUMENTS

| | | | | |
|---|---|---|---|---|
| 2003/0070156 | A1* | 4/2003 | Van Rens | G06F 9/451 717/100 |
| 2004/0054694 | A1* | 3/2004 | Piccionelli | G06Q 30/02 |
| 2004/0234097 | A1* | 11/2004 | Verhoeven | G06T 11/00 382/100 |
| 2006/0068768 | A1* | 3/2006 | Sanding | H04W 8/186 455/418 |
| 2007/0025686 | A1* | 2/2007 | Shorthouse | A47G 33/004 386/278 |
| 2008/0177406 | A1 | 7/2008 | Galvin et al. | |
| 2008/0301561 | A1 | 12/2008 | Bain | |
| 2009/0281794 | A1* | 11/2009 | Ben-Haroush | G06Q 30/0603 704/201 |
| 2010/0180207 | A1* | 7/2010 | MacGuire | G06Q 30/0603 715/745 |
| 2011/0294473 | A1* | 12/2011 | Subburam | H04N 1/00132 455/414.1 |
| 2011/0299670 | A1* | 12/2011 | Krause | G06Q 30/0603 379/88.13 |
| 2012/0284649 | A1* | 11/2012 | Levy | G06Q 50/01 715/753 |
| 2013/0138967 | A1* | 5/2013 | Auld | H04L 9/3231 713/180 |
| 2013/0239448 | A1* | 9/2013 | Davis | B42D 15/022 40/124.03 |
| 2014/0036302 | A1* | 2/2014 | Goldberg | G06F 17/214 358/1.15 |
| 2014/0321834 | A1* | 10/2014 | Segal | H04N 5/265 386/282 |
| 2015/0324886 | A1* | 11/2015 | Hurst | G06Q 50/01 705/26.5 |
| 2015/0332105 | A1* | 11/2015 | Waters | G06K 9/00892 382/116 |

OTHER PUBLICATIONS

International Search Report with Written Opinion dated Aug. 10, 2015 in Application No. PCT/US2015/030063, 11 pages.
International Preliminary Report on Patentability dated Nov. 24, 2016 in Application No. PCT/US2015/030063, 7 pages.

* cited by examiner

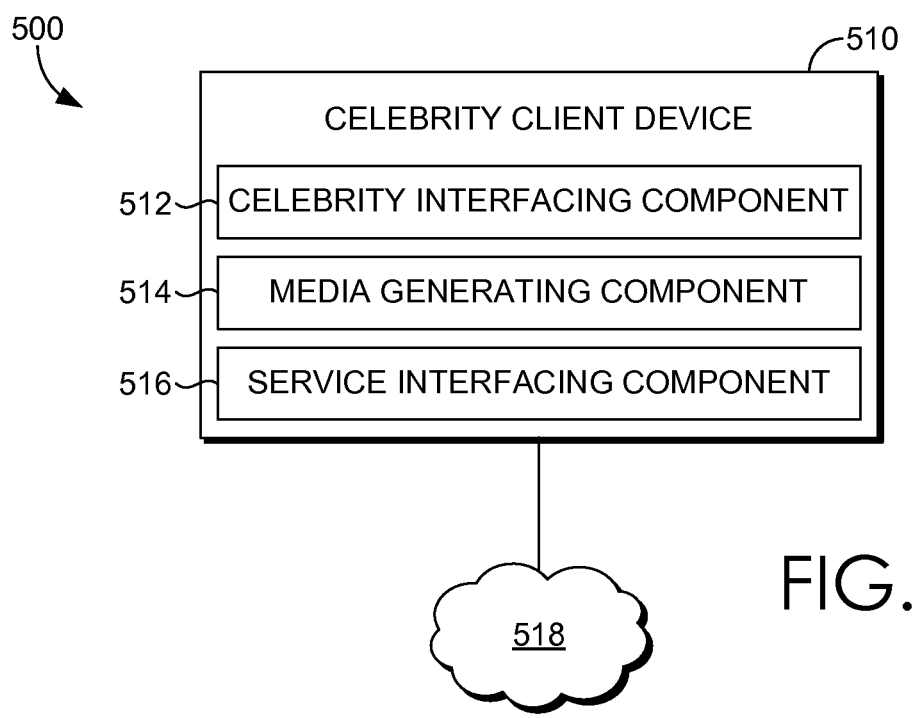

US 10,332,095 B2

GENERATION AND EXCHANGE OF CUSTOM SELF-RECORDED MULTIMEDIA

CROSS REFERENCE TO RELATED APPLICATIONS

This application claims the benefit of U.S. Provisional Application Ser. No. 61/991,151, filed on May 9, 2014.

BACKGROUND

Social media provides a robust medium for users to interact with one another by exchanging information and ideas in virtual communities and social networks. Sharing user-generated content has become increasingly popular in recent years, as social media networks provide interactive platforms for users to share images, videos, and the like. As interesting content is in high demand, users continue to seek novel content to share with friends and family. Self-portraits, photos, videos, Internet memes, among many others, are just a few examples of entertaining content that users share with their network as such posts generally tend to garner more attention. The advent of mobile computing technologies provides users with a mobile platform for the generation of personalized content and posting of the same on social media networks.

Electronic messages delivered through social media networks can also provide users with a direct link of communication to public figures (e.g., celebrities, politicians, athletes, etc.). Though public figures aren't required to respond to electronic messages received by way of social media, one of the perceived conveniences of social media platforms is the public figures' ability to review and respond to messages at their own convenience in view of their busy schedules. Electronic messages provide public figures the freedom to selectively review and respond to messages of their choosing, without the stresses of meeting demands of live or scheduled communications.

SUMMARY

This summary is provided to introduce a selection of concepts in a simplified form that are further described below in the detailed description. This summary is not intended to identify key features or essential features of the claimed subject matter, nor should it be used as an aid in determining the scope of the claimed subject matter.

A computer-implemented method for facilitating an electronic transaction between a consumer and a service subject is described. The method provides for display a plurality of service subject profiles, each service subject profile corresponding to a service subject offering an exchange of a self-recorded media produced by the service subject for an electronic payment made by a consumer. The method then sends the request to a computing device of the service subject corresponding to the selected one of the plurality of service subject profiles. The method then receives the self-recorded media from the computing device of the selected one of the plurality of service subjects, the self-recorded media including a recorded performance of the consumer-provided expression. The method then transmits the received self-recorded media including the recorded performance of the consumer-provided expression to the consumer to complete the exchange.

In another embodiment, described is a non-transitory computer storage medium storing computer-useable instructions that, when used by one or more computing devices, cause the one or more computing devices to perform operations for facilitating an electronic transaction between a consumer and a service subject. The operations include receiving a notification provided by a remote server device, the notification corresponding to a consumer request to provide a self-recorded media including a recorded performance of a consumer-provided expression. The operations also include receiving an input to initiate generation of the self-recorded media. The operations further include activating, upon receipt of the input to initiate generation of the self-recorded media, a microphone and a front-facing camera of the computing device. In accordance with activating the microphone and the front-facing camera, the operations also include providing for presentation on a portion of the display most adjacent to the front-facing camera, a teleprompter configured to display an instance of the consumer-provided expression. The operations even further include generating the self-recorded media to fulfill the consumer request, the self-recorded media being a recording of inputs provided by the microphone and the front-facing camera, the recording including the recorded performance of the consumer-provided expression.

In yet another embodiment, a system for facilitating an electronic transaction between a consumer and a service subject is described. The system includes one or more processors and one or more computer storage media storing computer-usable instructions. When used by the one or more processors, the computer-usable instructions cause the one or more processors to provide for display a plurality of service subject profiles, each service subject profile corresponding to a service subject offering an exchange of a self-recorded media produced by the service subject for an electronic payment made by a consumer. The instructions also cause the one or more processors to receive a consumer selection of one of the plurality of service subject profiles, electronic payment information, and a request that the service subject corresponding to the selected one of the plurality of service subject profiles record a consumer-provided expression in the self-recorded media. The instructions further cause the one or more processors to send the request to a computing device of the service subject corresponding to the selected one of the plurality of service subject profiles. The instructions even further cause the one or more processors to receive the self-recorded media from the computing device of the selected one of the plurality of service subjects, the self-recorded media including a recorded performance of the consumer-provided expression. The instructions then cause the one or more processors to transmit the received self-recorded media including the recorded performance of the consumer-provided expression to the consumer to complete the exchange.

BRIEF DESCRIPTION OF THE DRAWINGS

The present invention is described in detail below with reference to the attached drawing figures, wherein:

FIG. 5 is a block diagram illustrating an exemplary celebrity client device for facilitating the generation and exchange of custom self-recorded media, in accordance with embodiments described herein;

DETAILED DESCRIPTION

Figure 1:
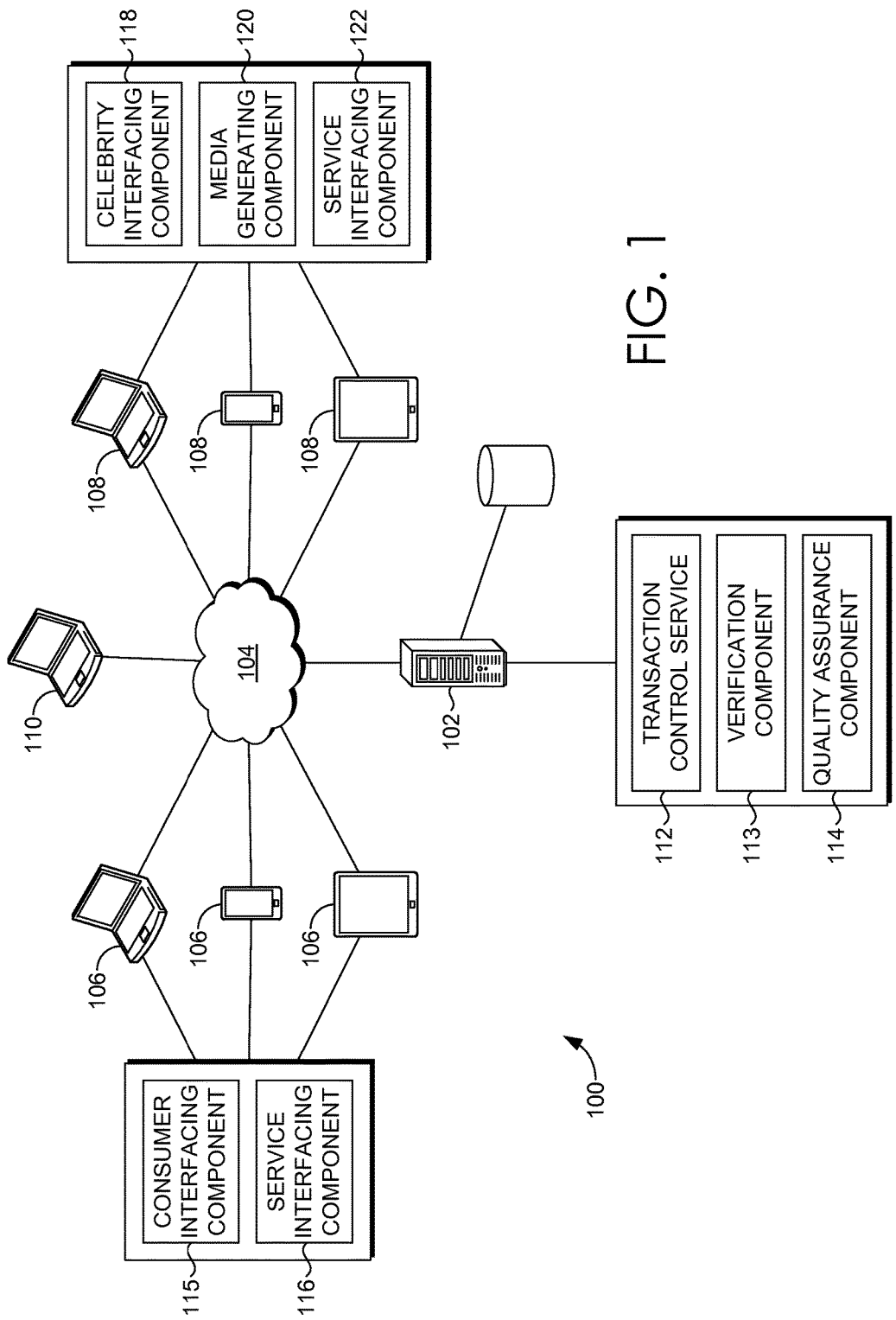
FIG. 1 is a block diagram of an exemplary operating environment for facilitating the generation and exchange of custom self-recorded media, in accordance with embodiments described herein.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments described herein are broadly directed to facilitating an electronic transaction between a "consumer" (also referred to herein as "user") and a "celebrity" (also referred to herein as "service subject"). The embodiments enable a consumer to view a list of participating celebrities on a website or application interface, the participating celebrities offering a custom self-recorded media in exchange for funds paid for by the consumer. The consumer can search the website for a particular celebrity participating in the offer for exchange, and view the terms of exchange for the particular celebrity. For instance, a participating celebrity can set, as terms of the exchange: a predetermined price for each custom self-recorded video, a number of custom self-recorded videos available for exchange, a charitable fund to which at least a portion of funds received will transfer upon completion of the exchange, and more. If the consumer accepts the terms of the participating celebrity, with payment of the requested fee, the consumer can request that the celebrity record a consumer-provided expression (e.g., recite a quote or answer a question) in the self-recorded media.

By way of a celebrity-specific mobile application, celebrities can easily activate or deactivate their participation in the offer for exchange. The celebrities can also set the terms of exchange, as previously described. The celebrity mobile application can be configured to notify the celebrity of incoming acceptances in the offers for exchange and can further be configured to facilitate the generation and transmission of the custom self-recorded video, as will be described.

Embodiments described herein provide consumers a way to interface with celebrities and order custom self-recorded media from a celebrity of the consumers' choosing in exchange for a fee. As previously described, public figures can have extremely demanding schedules and oftentimes turn down speaker engagements or even cancel on engagements due to unexpected circumstances. Embodiments described in the provided disclosure enable consumers to request, in exchange for a fee, custom self-recorded videos from celebrities of their choosing, and further facilitate a secure and reliable exchange there between.

With the prevalence of fraudulent registrants on the Internet, determining whether a purported celebrity registering to participate in the service is "actually a celebrity" can also pose a challenge. In some embodiments described herein, aspects of the disclosure describe methods for electronically verifying that a registrant is the celebrity that he/she is purportedly claiming to be. By employing services associated with third-party social media providers, purported celebrities can be verified as true celebrities in a matter of seconds as opposed to undergoing a lengthy verification process, as will be described.

Once registered with the service, it is desirable to provide the celebrity with a clean and user-friendly interface for creating the custom self-recorded video. For instance, providing the consumer-provided expression to the celebrity while recording the video can provide the celebrity with a teleprompter display, such that the celebrity does not need to rehearse or memorize expressions prior to the creation of a video. In this regard, attracting the celebrities eyes toward the front-facing camera can ensure that the video appears to be more personal, without making evident that the celebrity is actually reading a script from a teleprompter.

An infrastructure configuration for facilitating exchange of custom self-recorded media and electronic fund transfers can include at least one server device and a plurality of client devices, wherein the at least one server device can be configured to facilitate the exchange between at least one consumer client device and at least one celebrity client device. The server device can be further configured to store the custom self-recorded media in a memory (e.g., a database or memory storage device) for providing streaming access thereto, or simply facilitate the transfer of the custom self-recorded media between client devices. In some instances, the at least one server device can be configured to provide the at least one consumer client device and at least one celebrity client device with user interfaces by providing websites to facilitate the exchange. In some other instances, the server can be configured to interface with applications configured to operate on the client devices, the applications also being configured to facilitate the exchange.

In accordance with embodiments described herein, FIG. 1 illustrates an exemplary operating environment 100 in which some embodiments of the present disclosure may be employed. Other arrangements and elements (e.g., machines, interfaces, functions, orders, groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The operating environment 100 of FIG. 1 includes a server device 102 that facilitates the exchange of custom self-recorded videos for a predetermined fee, as will be described. As one of ordinary skill in the art may appreciate, a server device can refer to one or more server devices operating in a distributed computing environment. The server device 102 is accessible to a plurality of computing devices over a network 104 (e.g., the Internet or a telecommunications network). In this example, a plurality of consumer client devices 106 (e.g., PCs, mobile phones, tablets, etc.) are operable to communicate with the server device 102 over the network 104. The server device 102 can be configured to provide a user interface to the consumer client devices 106 (e.g., providing a website) or can be configured to interface with a standalone application (e.g., a mobile app) installed on the consumer client devices 106. Similarly, a plurality of celebrity client devices 108 (e.g., PCs, mobile phones, tablets, etc.) are also operable to communicate with the server device 102 over the network 104. The server device 102 can also be configured to provide a user interface to the celebrity client devices 108 (e.g., providing a website) or can be configured to interface with a standalone application (e.g., a mobile app) installed on the celebrity client devices 106.

As described, the operating environment 100 of FIG. 1 includes the server device 102, at least one consumer client device 106, and at least one celebrity client device 108. The at least one consumer client device 106 and at least one celebrity client device 108 can be in communication with the server device 102, the server device 102 facilitating transactions and functioning as a conduit there between. In one aspect, the server device 102 can also be in communication with at least one third-party computing device 110 (e.g., a PC, mobile phone, tablet, etc.), for instance, by sending either an instance of the custom self-recorded media or sending a URL for accessing the custom self-recorded media via email, SMS, social media, or other communication means. In another aspect, the server device 102 can further be in communication with at least one social media platform, for instance, by employing the social media platform API for purposes of user registration, user verification, or sharing data amongst social contacts in the platform's social network, among other things.

The communications between the aforementioned devices can take place over a network, such as the Internet or a telecommunications network. In embodiments, the server device 102 includes, among other things, a transaction control service 112, a verification component 113, and a quality assurance component 114. The transaction control service 112 can, among other things, provide limited-access control to both consumers and celebrities, receive information from both consumers and celebrities related to the offer and exchange, facilitate delivery of notifications to both consumers and celebrities pertaining to each offer and exchange, receive and store in memory custom self-recorded videos related to an exchange, and facilitate the transaction and delivery of funds as a result of the exchange. The verification component 113 can, among other things, verify whether a purported celebrity is actually a celebrity, and define a verified profile associated with each celebrity participating in an exchange. The quality assurance component 114 can, among other things, facilitate a review in various stages of the exchange to ensure that minimum standards necessary to enable the exchange are being met (i.e., the consumer-provided expression is appropriate and meets policy guidelines and/or the custom self-recorded media meets policy guidelines).

The at least one consumer client device 106 can include, among other things, a consumer interfacing component 115 and a service interfacing component 116. As will be described in more detail herein, in some embodiments, the consumer interfacing component 115 can provide for display a user interface to the consumer for communicating information relevant to conducting the exchange. The consumer interfacing component 115 can also be configured to receive input data provided by the consumer and communicate the input data to the server device 102 by way of the service interfacing component 116. The service interfacing component 116 is configured to communicate with the transaction control service 112 of the server device 102 through the network 104.

The at least one celebrity client device 108 can include, among other things, a celebrity interfacing component 118, a media generation component 120, and a service interfacing component 122. As will be described in more detail herein, in some embodiments, the celebrity interfacing component 118 can provide for display a user interface to the celebrity for communicating information relevant to conducting the exchange. The celebrity interfacing component 118 can also be configured to receive input data provided by the celebrity and communicate the input data to the server device 102 by way of the service interfacing component 122. The media generation component 120 can be configured to interface with the media recording hardware (e.g., video camera and/or microphone) of the celebrity client device 108. As will be described, the media generation component 120 can be configured to, among other things, activate and deactivate the media recording hardware, initiate a recording process with the media recording hardware, and store a recording of the recorded media on a memory of the celebrity client device 108. The service interfacing component 122 is configured to communicate with the transaction control service 112 of the server device 102 through the network 104.

Figure 2:
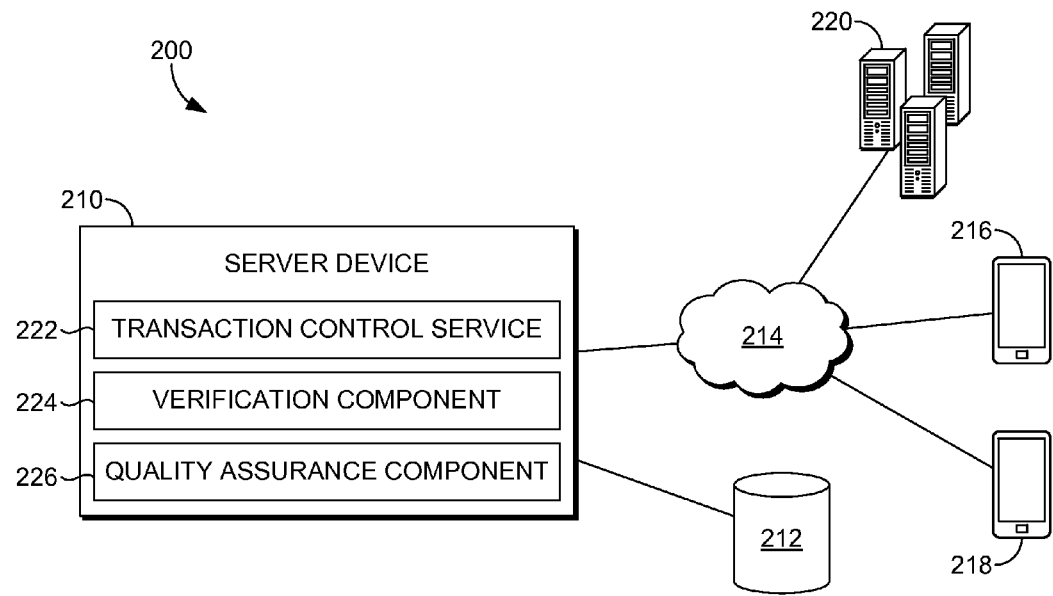
FIG. 2 is a block diagram illustrating an exemplary server device for facilitating the generation and exchange of custom self-recorded media, in accordance with embodiments described herein.

Moving now to FIG. 2, a block diagram 200 illustrating the server device 210 is provided. As previously described, the server device 210 can comprise one or more computing devices for performing at least some of the functions described herein. The server device 210 can include at least one processor and at least one memory 212 (e.g., a memory storage device or database). The server device 210 is operable to communicate with other components of the system over a network 222 (e.g., the Internet). The server device 210 can include a transaction control service 214 that can, among other things, provide limited-access control to both consumer client devices 216 and celebrity client devices 218, receive information from both consumer client devices 216 and celebrity client devices 218 related to the offer and exchange, facilitate delivery of notifications to both consumer client devices 216 and celebrity client devices 218 pertaining to each offer and exchange, receive from celebrity client devices 218 and store in memory custom self-recorded videos related to an exchange, and facilitate the transaction and delivery of funds as a result of the exchange.

Limited-access controls can be provided by the server device 210 by associating login credentials specific to each user (e.g., an administrator, a consumer, a celebrity, or a celebrity manager). As one of ordinary skill in the art may appreciate, limited-access controls can be implemented associating unique identifiers and passwords that correspond to each unique user. For instance, not only are user accounts personal to each user, but depending on certain identifying characteristics provided by the user, the system or an administrator thereof can grant the user access to features having celebrity-only access (e.g., creating a celebrity profile, creating a custom self-recorded media, etc.) or consumer-only access (e.g., requesting a custom self-recorded media). In some instances, a celebrity manager can be provided manager-only access and assigned at least partial access to one or more celebrity user accounts (e.g., viewing and editing one or more celebrity profiles, viewing pending or fulfilled requests, rejecting and/or allowing pending requests, etc.).

In some embodiments, incorporating login modules from third-party social media platforms 220 (i.e., via user account login APIs) can be employed to provide access to the system by associating the username and password from the third-party social media platform to the user account, or alternatively, receiving a successful login indication from the third-party social media platform module to provide authorized access to the system. In some embodiments, the incorporation of login modules from third-party social media platforms can also provide methods for accelerated celebrity authentication, as will be described in more detail with regards to the verification component 224.

As previously described, the server device 210 is configured to maintain and provide for display a listing of celebrity (service subject) profiles. It is contemplated that only celebrity profiles that are verified will be listed on the webpage, as will be described in more detail herein. The listing of profiles can be provided on a webpage hosted on the server device 210. The webpage can be dynamically updated based on, among other things, a status associated with each of the celebrity profiles. For instance, each celebrity client device 218 can be provided with an "away mode" control interface that allows each celebrity to actively offer their services for providing a custom self-recorded media, or alternatively indicate that they are unavailable to provide such services. For example, an "away" switch may be presented to a celebrity that can be engaged/disengaged, the switch providing the server device 210 with an input indicating that the celebrity wants to remove their profile from the webpage listing. When the away mode is engaged, the celebrity profile will be removed from the webpage and, in some instances, the celebrity client device 218 may stop receiving notifications from the server device 210.

The server device 210 can also be configured to receive profile information from the celebrity client devices 218, the profile information relating to, among other things, third parties (e.g., charities) to which at least a portion of the celebrity's profits will be transferred, a percentage or amount of profits that will be transferred to the third parties, a price corresponding to each or all offers for exchange, and a number of custom self-recorded media the celebrity is willing to offer for exchange. In order to create a celebrity profile, a purported celebrity must request the creation of a celebrity account either through the celebrity client device 218 interfacing with the server device 210 or through a website hosted by the server device 210.

The creation of celebrity profiles can require numerous steps to verify that a purported celebrity registrant is an actual celebrity. In one embodiment, the verification of a celebrity profile can include a manually performed process, requiring that the celebrity submit to an administrator, in addition to registration information and verification documentation (e.g., copy of driver license, birth certificate, mailing address, agent contact information, etc.). Although such a verification process is time-consuming, it is important to consider the abundance of fraudulent claims that are likely to be made over the Internet. In another embodiment, the third-party social media platform 220 login modules, as previously described, can be employed to provide quick celebrity verification. For instance, services such as Twitter® or Facebook® may require that celebrities verify their accounts to establish authenticity of their identities. Though not described herein, it is contemplated that such social media platforms provide reliable methods for verifying that a purported celebrity is an actual celebrity. Once verified, verified profiles may be labeled with a "verified" checkmark, badge, or the like, to further indicate that the celebrity user is authentic. To this end, employing login modules provided by these social media platforms can expedite the verification process of purported celebrity registrants. For instance, if a purported celebrity tries to register for a new profile, he/she could either create a new account using the login module implemented on a celebrity account creation page, or alternatively, the login module can be provided to the purported celebrity after the creation of an unverified account and used for verification purposes.

Figure 3:
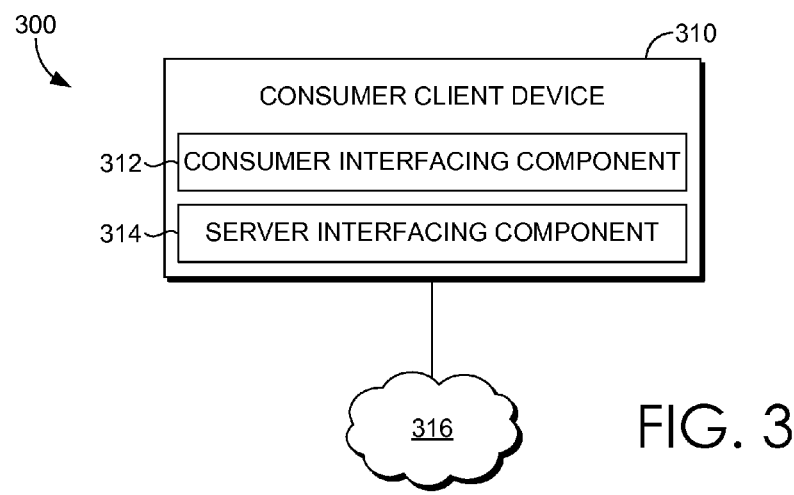
FIG. 3 is a block diagram illustrating an exemplary consumer client device for facilitating the generation and exchange of custom self-recorded media, in accordance with embodiments described herein.

With brief reference to the block diagram 300 of FIG. 3, the consumer client device 310 is a computing device including a consumer interfacing component 312 and a service interfacing component 314. The consumer interfacing component 312 is configured to present for display, data and a user interface to the consumer user, and further receive inputs provided by the consumer. The inputs received by the consumer can be communicated from the service interfacing component 314, through a network 316, to the server device 210 of FIG. 2. The server device 210 can also provide, through the network 316, the service interfacing component 314 with data for presentation to the consumer.

Figure 4A:
FIGS. 4A-4F are exemplary screenshots illustrating user interfaces provided for display on an exemplary consumer client device, in accordance with embodiments described herein.
Figure 4B:
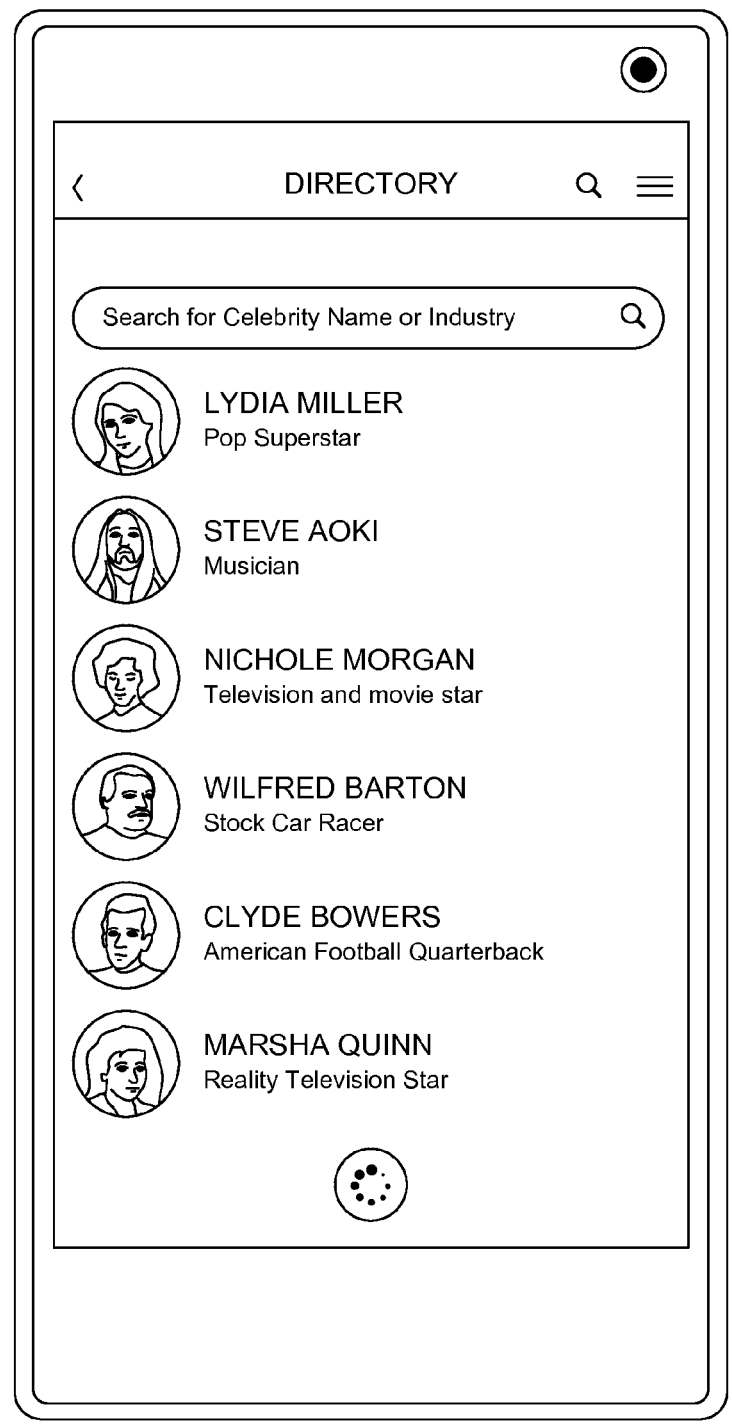
Figure 4C:
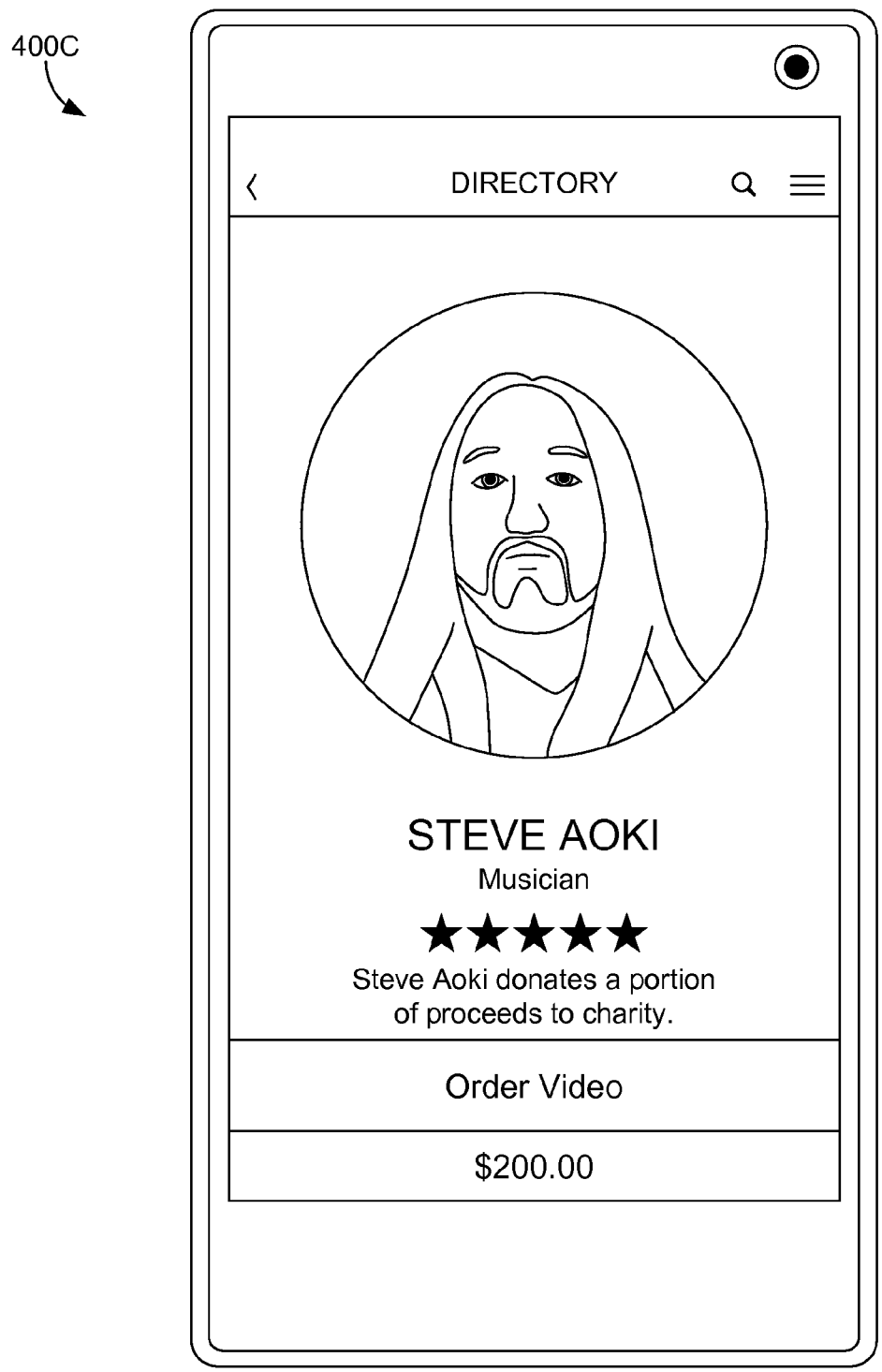
Figure 4D:
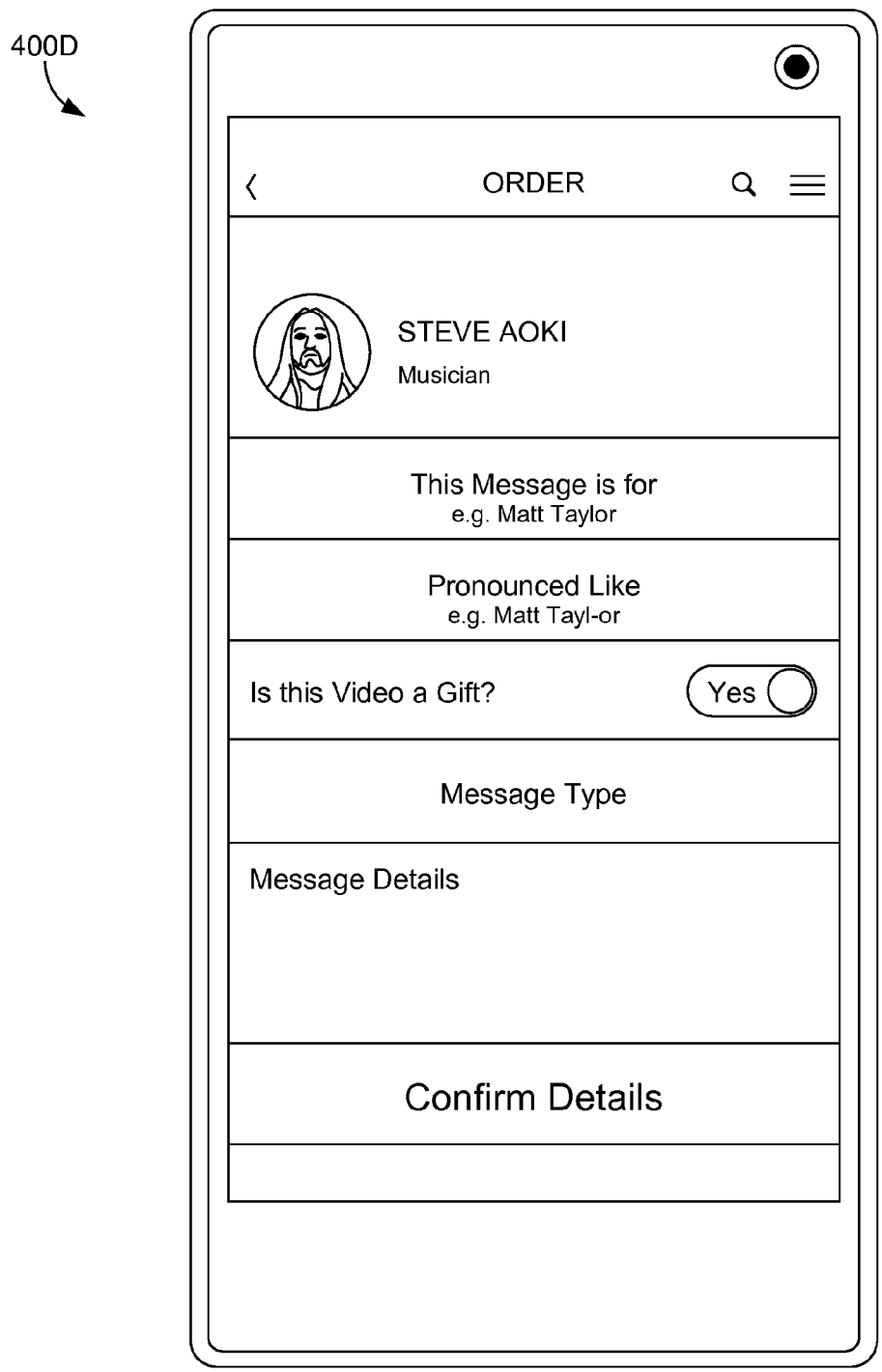

The server device 210 of FIG. 2 is configured to facilitate the exchange of a custom self-recorded media created by a celebrity, for a determined monetary value set by the celebrity and paid for by the consumer. The listing of celebrity profiles on the webpage or application provided on a consumer client device 310 is operable to provide an offer for services/goods in exchange for a cash value. In essence, any consumer registrant can view and/or search the celebrity profile listing on, for instance, profile listing pages 400A and 400B of FIGS. 4A-4B, and select any particular celebrity to create a custom self-recorded media in exchange for a predetermined price. If the consumer chooses to accept a particular celebrity's offer for exchange using, for instance, celebrity's offer page 400C of FIG. 4C, the consumer is tasked with (1) providing a consumer-provided expression for the particular celebrity when creating the custom self-recorded media using, for instance, order details page 400D of FIG. 4D, and (2) to submit payment information for the predetermined price employing, for instance, check-out page 400E of FIG. 4E. In other words, the consumer can provide the celebrity with a quote (e.g., "Happy birthday to my number one fan, Austin!") or a question (e.g., "What is your favorite food?"), and anticipate that the celebrity will perform this expression in the self-recorded media within a predetermined timeframe 410F communicated to the consumer through, for instance, confirmation page 400F of FIG. 4F. The consumer-provided expression can be any length, but is preferably around or less than two hundred characters to easily display the expression to the celebrity upon creation of the self-recorded media, as will be described.

Figure 4E:
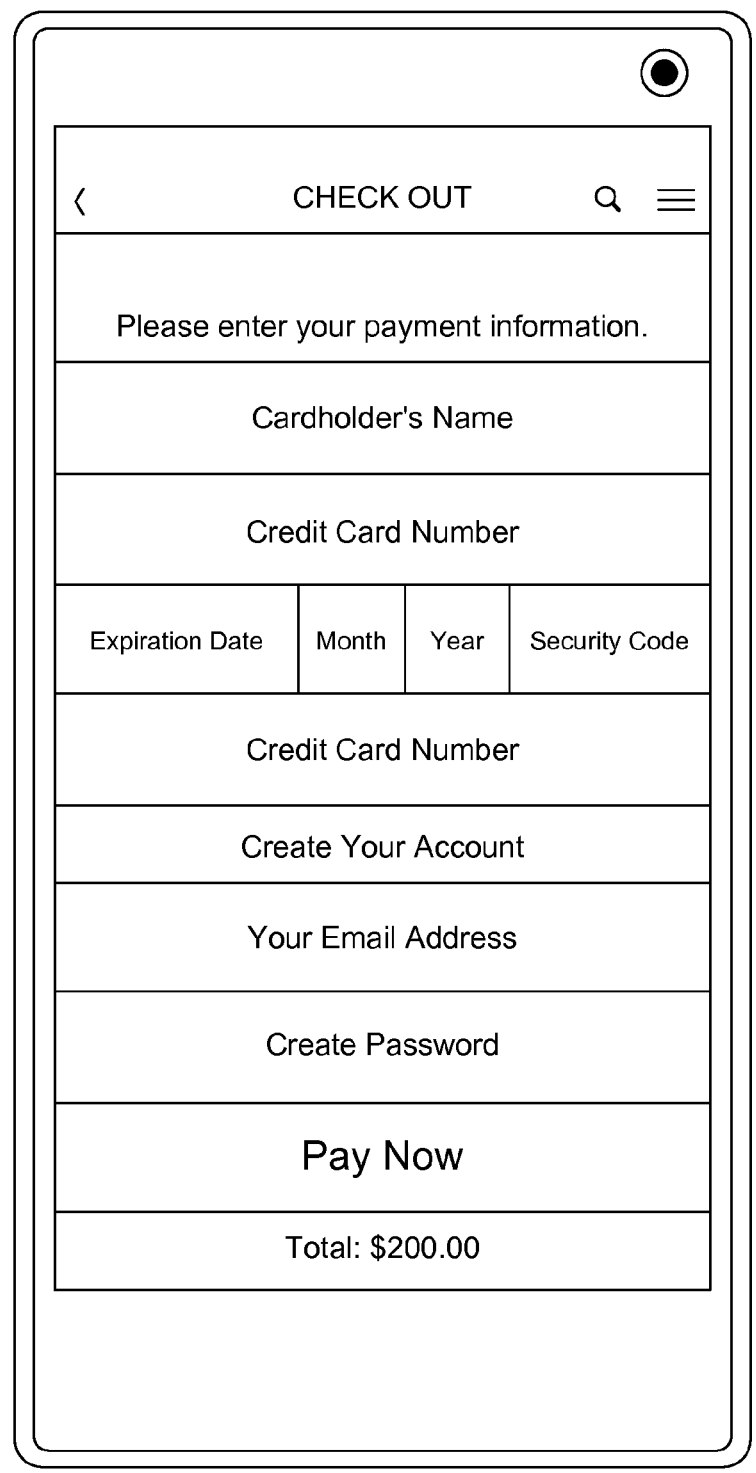
Figure 4F:
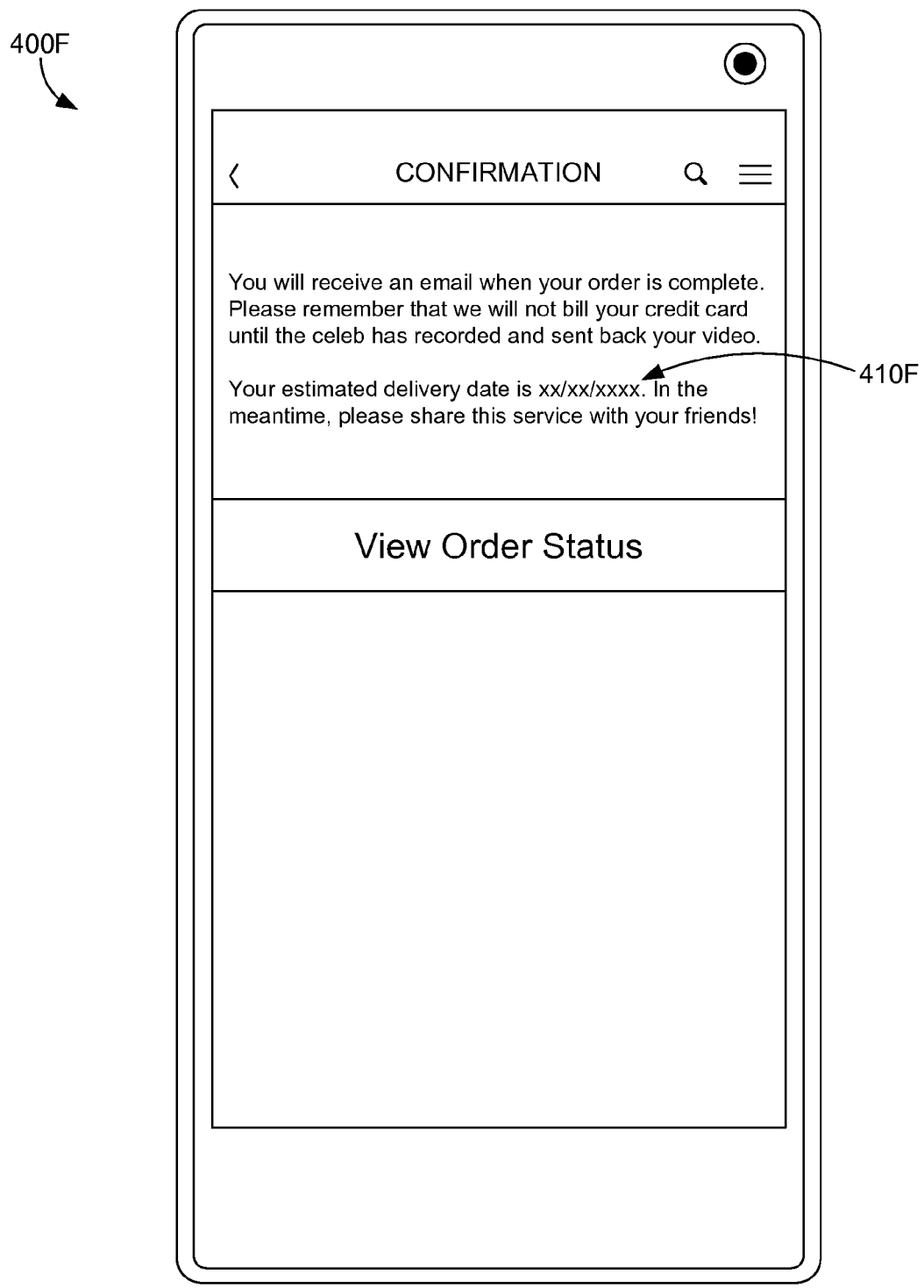

Upon receipt of a selection of a particular celebrity profile, the selection provided by a consumer on the consumer client device 310, the server device 210 of FIG. 2 can be configured to also receive payment information for the consumer as part of the consumer's acceptance of the celebrity's offer to exchange services/goods, as illustrated in check-out page 400E of FIG. 4E. Moreover, the server device 210 can further receive a request that the celebrity record a consumer-provided expression in a self-recorded media, as illustrated in order details page 400D of FIG. 4D. Once the consumer's acceptance of the celebrity's offer for exchange has been received, the server device 210 can be configured to send a notification in accordance with the request to the particular celebrity's client device 218 via email, SMS, push notification, or other communication means.

Looking now at FIG. 5, a block diagram 500 is provided illustrating a celebrity client device 510. The celebrity client device 510 is a computing device including a celebrity interfacing component 512, a media generating component 514, and a service interfacing component 516. Although not illustrated, the celebrity client device 510 includes media generating hardware (e.g., a front-facing camera and a microphone) for interfacing with the media generating component 514. In some embodiments, the celebrity interfacing component 512, media generating component 514, and service interfacing component 512 can be distributed amongst a plurality of celebrity client devices 510 (i.e., a mobile computing device and a wearable computing device) working together as a paired entity. For instance, a wearable computing device (e.g., smart watch) paired with a computing device (e.g., smart phone or PC) can include the front-facing camera and the microphone, and further include at least a portion of the celebrity interfacing component 512, media generating component 514, and/or service interfacing component 512. In such embodiments, the paired mobile computing device can receive the media feed provided by the media generating hardware for processing, as will be described. The celebrity interfacing component 512 is configured to present for display data and a user interface to the celebrity user, and further receive inputs provided by the celebrity. The inputs received by the celebrity can be communicated from the service interfacing component 516, through a network 518, to the server device 210 of FIG. 2. The server device 210 can also provide, through the network 518, the service interfacing component 516 with data for presentation to the celebrity.

Figure 6A:
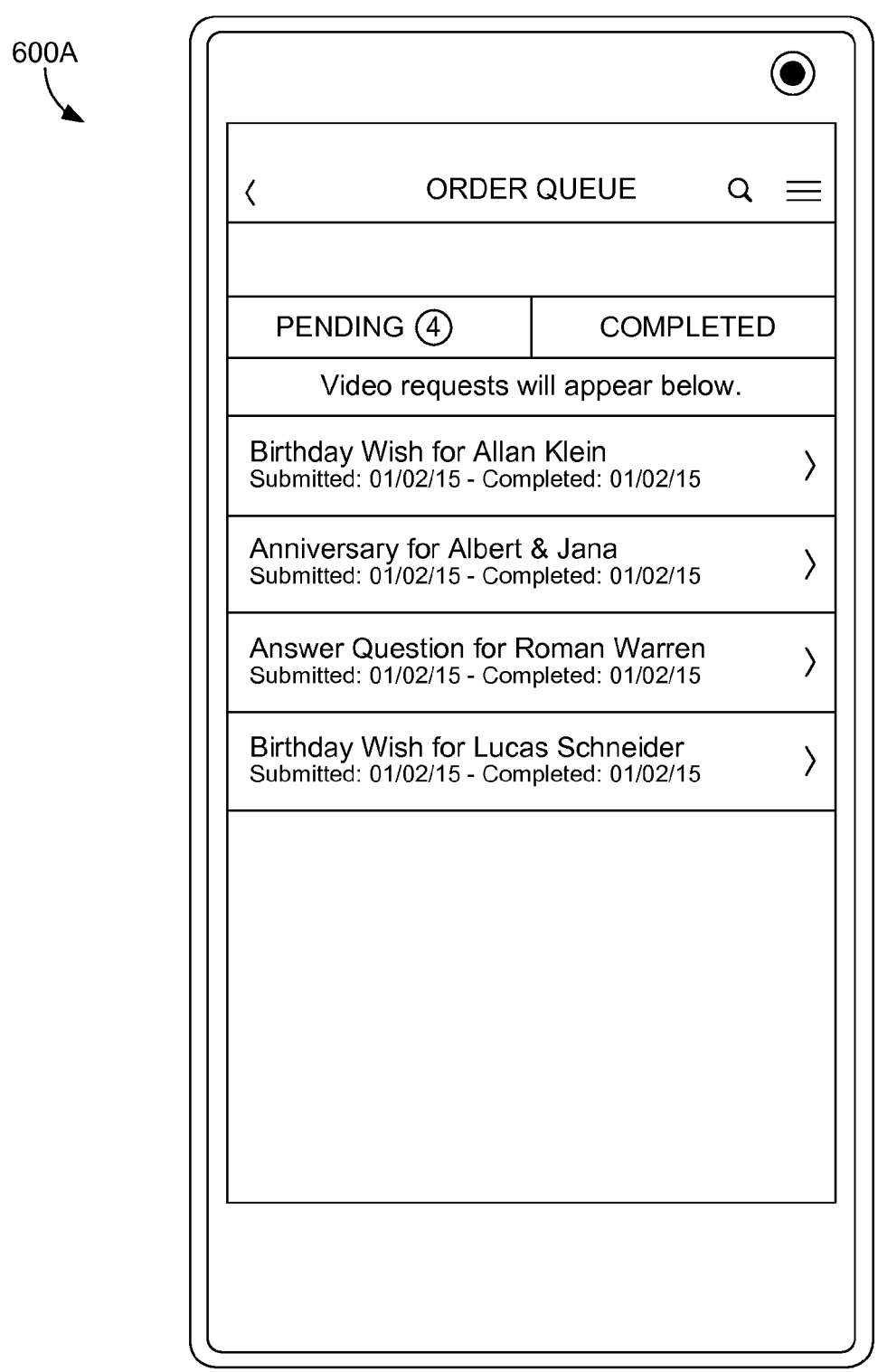
FIGS. 6A-6D are exemplary screenshots illustrating user interfaces provided for display on an exemplary celebrity client device, in accordance with embodiments described herein.

In one embodiment, the notification sent to the celebrity client device 510 is a push notification associated with a celebrity client device application configured to interface with the server device 210. In other embodiments, the request can be an SMS, email, or other message, including a URL operable to direct the celebrity client device 510 to a website also configured to interface with the server device 210. Regardless of the method for accessing the server device 210, the celebrity client device 510 can now display the pending request for review, as illustrated in order queue page 600A of FIG. 6A.

Figure 6B:
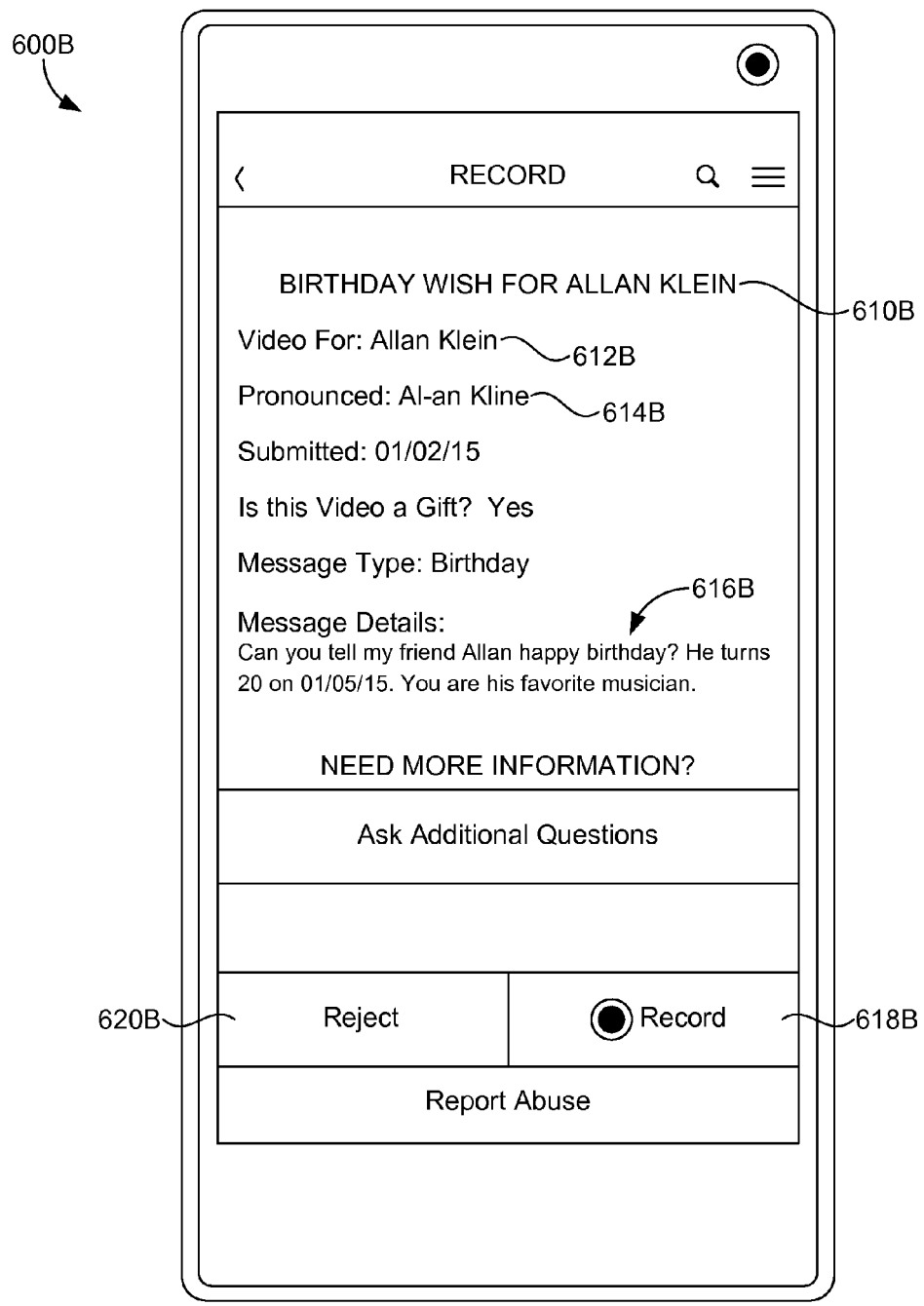

The celebrity client device 510 can receive instructions from the celebrity user to fulfill a particular consumer request by selecting the request or a representation thereof and initiating a self-recorded media session via the media generating component 514. The self-recorded media session will be associated with the selected consumer request, such that the final recording will also be associated with the selected consumer request. In embodiments, selection of a particular consumer request will initiate a review of request details, as illustrated in FIG. 6B. The request details page 600B provides for display, among other things, a title of the request 610B, an intended recipient of the media 612B, a phonetic pronunciation of the intended recipient 614B, and the consumer provided expression 616B (i.e., the message to be recited by the celebrity or question to be answered by the celebrity). The celebrity client device 510 can further prompt the celebrity to record 618B the self-recorded media or to reject the request 620B. If the celebrity client device 510 receives an input indicating a rejection 620B, the input is provided to the server device, which then sends a rejection notification to the consumer client device. Alternatively, if the celebrity client device 510 receives an input indicating "record" 618B, the media generating component 514, interfacing with the celebrity client device 510 camera and microphone, can activate the front-facing camera and microphone to instantiate the self-recording session, as illustrated in screenshot 600C of FIG. 6C.

Figure 6C:
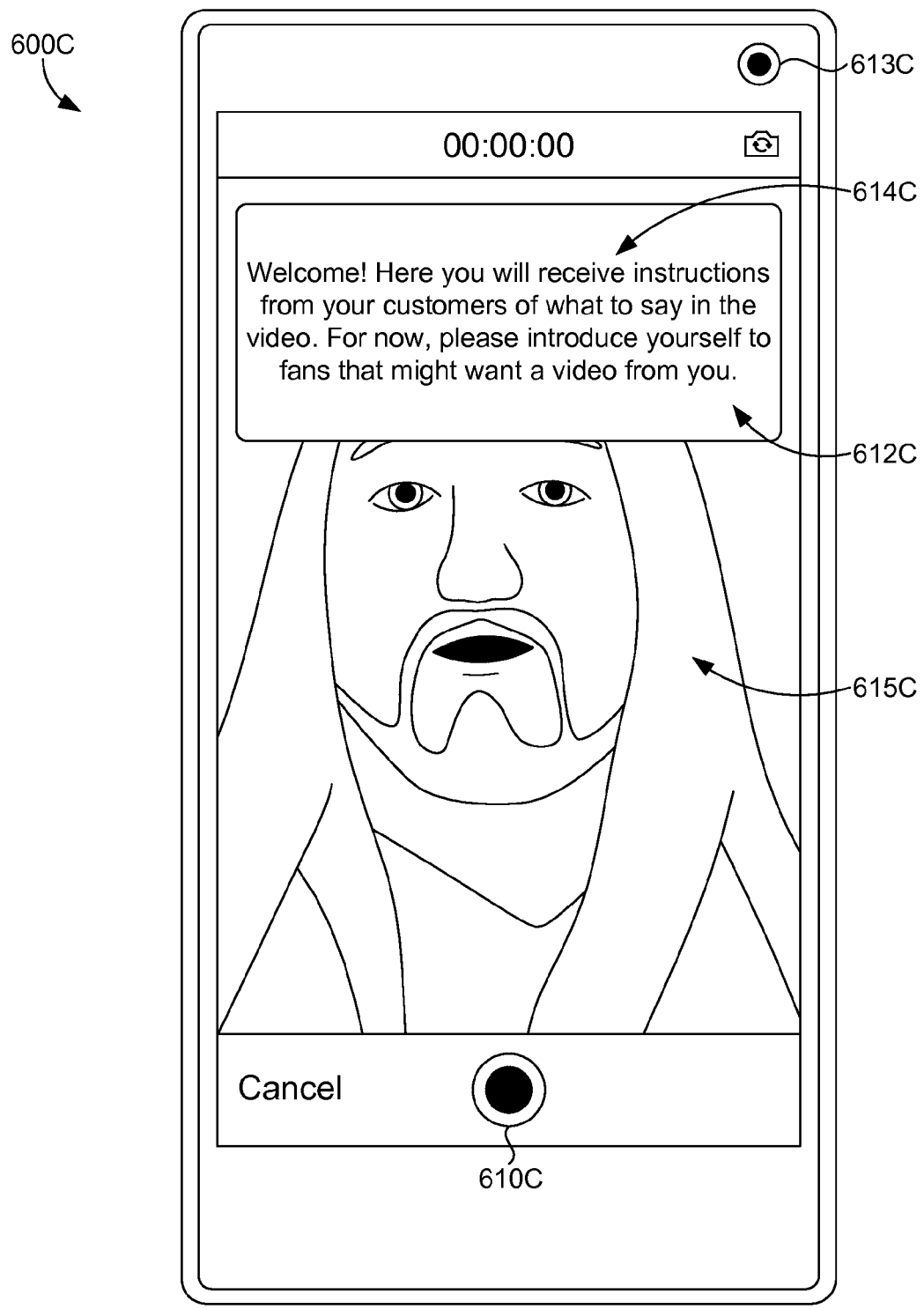

The media generating component 514 of FIG. 5 is configured to instantiate a self-recording session, as illustrated in FIG. 6C, which provides at least a record input button 610C and a virtual teleprompter module 612C. Upon instantiation of the self-recording session, the front-facing camera 613C is activated such that the celebrity can view him/herself on screen 615C, the screen displaying a video feed input provided by the front-facing camera 613C. In some instances, the rear-facing camera can be instantiated in lieu of the front-facing camera, which may be employed in instances where another party is recording the video for the celebrity. The record input button 610C is configured to initiate recording of the custom self-recorded media, as described herein. More particularly, the video feed provided by the front-facing camera 613C is stored in a digital media file, along with audio input simultaneously received by the microphone.

Though it is not necessary to limit the recording time of the media, it is contemplated that generated media having a long recording time can consume a large amount of storage space. To this end, the virtual teleprompter module 612C is configured to display an instance of the consumer-provided expression 614C. In embodiments, the virtual teleprompter module 612C is translucent in nature and is presented as an overlay on the video feed 615C provided by the front-facing camera. The virtual teleprompter module 612C can be fixed in size, so that the celebrity can see themselves without interference from the text of the consumer-provided expression 614C. Further, as was described herein, the consumer-provided expression 614C is limited in size (i.e., about two hundred characters), so that the teleprompter module 612C can easily display the expression and keep the expression short in duration. In some embodiments, the consumer-provided expression 614C can scroll automatically at a predefined pace, or can be scrolled manually in response to a received user input (e.g., a touch gesture). The virtual teleprompter module 612C is also presented on a portion of the display most adjacent to the front-facing camera 613C to facilitate the appearance that the celebrity is maintaining eye contact with the front-facing camera. More particularly, as the front-facing camera 613C is near the top portion of the celebrity client device, the teleprompter module 612C will be presented on a portion of the display most adjacent to the top portion of the celebrity client device.

Figure 6D:
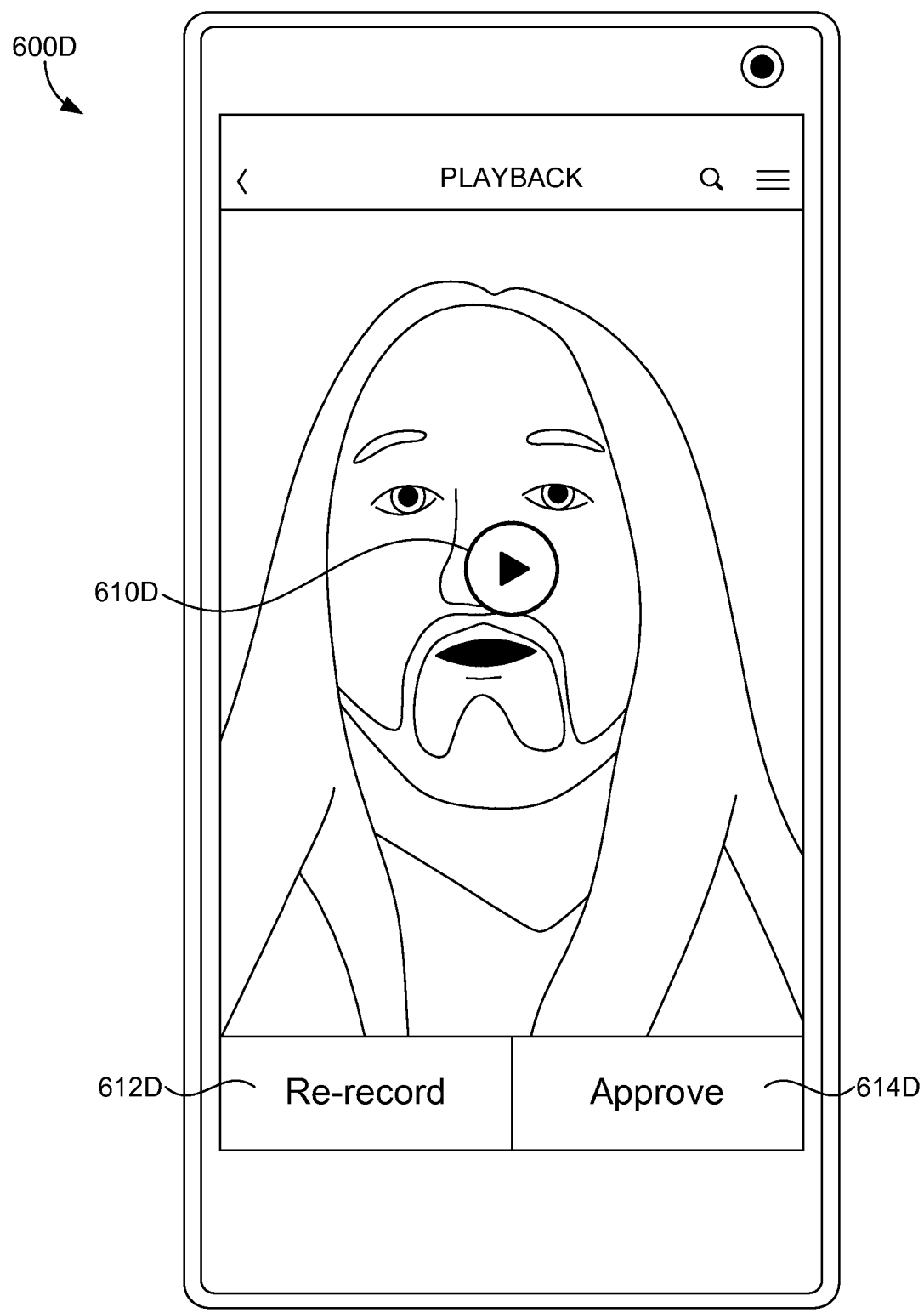

Upon a celebrity's completion of generating the custom self-recorded media, the celebrity client device 510 of FIG. 5 can further present for display a playback review module, as illustrated in playback review page 600D of FIG. 6D. The playback review page 600D includes options to review the custom self-recorded media 610D, re-record 612D the self-recorded media, or approve 614D the self-recorded media for delivery to the requesting consumer. Reviewing the custom self-recorded media 610D provides the celebrity an opportunity to playback the media 610D that was just generated and stored on their celebrity client device. Re-recording 612D the self-recorded media would re-instantiate a self-recording session, as illustrated in FIG. 6C. In the event the self-recorded media is approved for delivery 614D to the requesting consumer, a process is initiated on the celebrity client device 510, in response to the approval, to transmit the custom self-recorded media to the server device 210 of FIG. 2 over the network 214.

In some embodiments, when received by and stored on the server device 210, an instance of the custom self-recorded media can be sent to the requesting consumer. In other embodiments, when received by and stored on the server device 210, the custom self-recorded media can be stored and maintained on the server device 210 or, alternatively, on a third-party video hosting service (e.g., YouTube®) with a link to view the custom self-recorded media sent to the consumer or intended recipient. Receipt of the custom self-recorded media can initiate the processing of electronic funds immediately upon receipt of the media or after completion of administrator review, as will be described. The server device 210 can be configured to process the funds and transfer the relevant amounts to the celebrity and, in some instances, a third-party (e.g., a charity or servicer).

In some embodiments, upon the server device's 210 receipt of a consumer-provided expression in accordance with a consumer's order of a custom self-recorded media, or upon the server device's 210 receipt of a custom self-recorded media after generation thereof by a celebrity, a quality assurance component 226 can be employed to ensure that exchanged content (e.g., the consumer-provided expression or self-recorded media) meets minimum standards defined by a content policy. For example, it is desirable to filter unsatisfactory requests to celebrities (i.e., requests to make defamatory or self-deprecating statements) and also desirable to filter out unsatisfactorily generated custom self-recorded media (e.g., poor quality, celebrity does not perform requested expression, etc.). In some embodiments, the quality assurance component 226 can be an administrator-accessible interface (e.g., a website or application) that operates as a functional "break" in the automated-process chain, such that the process of conducting the transaction is placed in a queue for a human to review and approve or deny the information requiring quality assurance passing through. In more detail, orders for custom self-recorded media can be reviewed in detail, by a human, before passing the order through to the selected celebrity to ensure that the celebrity will not receive undesirable requests. Further, custom self-recorded media generated by celebrities can also be reviewed by a human before passing the media through to the requesting consumer, to ensure that the media meets minimum criteria.

Figure 7:
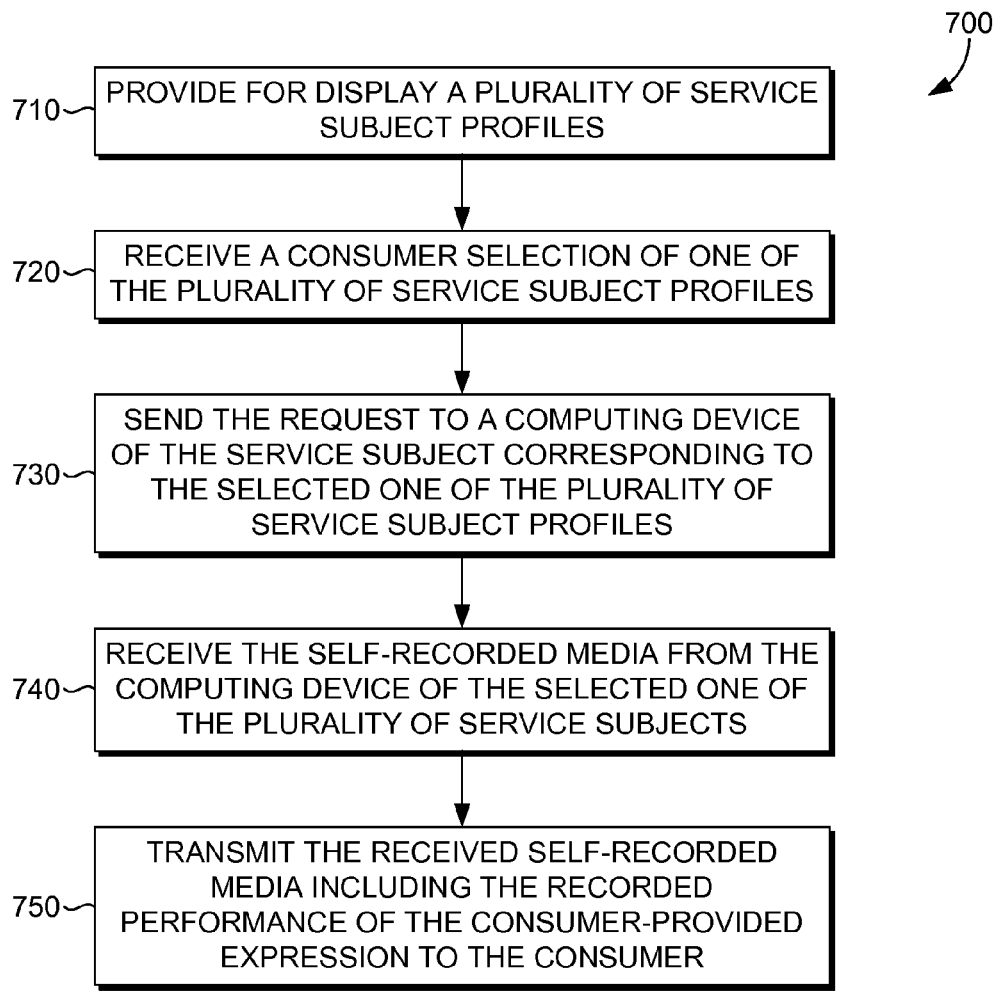
FIG. 7 is a flow diagram showing an exemplary method for facilitating the generation and exchange of custom self-recorded media, in accordance with embodiments described herein.

Turning now to FIG. 7, a flow diagram is provided that illustrates a method 700 for facilitating an exchange and delivery of custom self-recorded media. Initially, at block 710, a plurality of service subject (celebrity) profiles is provided for display. Each service subject profile corresponds to a service subject that is offering for exchange a self-recorded media produced by the service subject in exchange for an electronic payment made by a consumer. At block 720, a selection of one of the plurality of service subject profiles is received, the selection being made by the consumer. In addition to the selection, electronic payment information and a request that the service subject record a consumer-provided expression are received. At block 730, a request is sent to a computing device of the selected service subject. At block 740, a self-recorded media is received from the selected service subject's computing device, the self-recorded media including a recorded performance of the consumer-provided expression. At block 750, the received self-recorded media is transmitted to a computing device of the consumer in order to complete the exchange.

Figure 8:
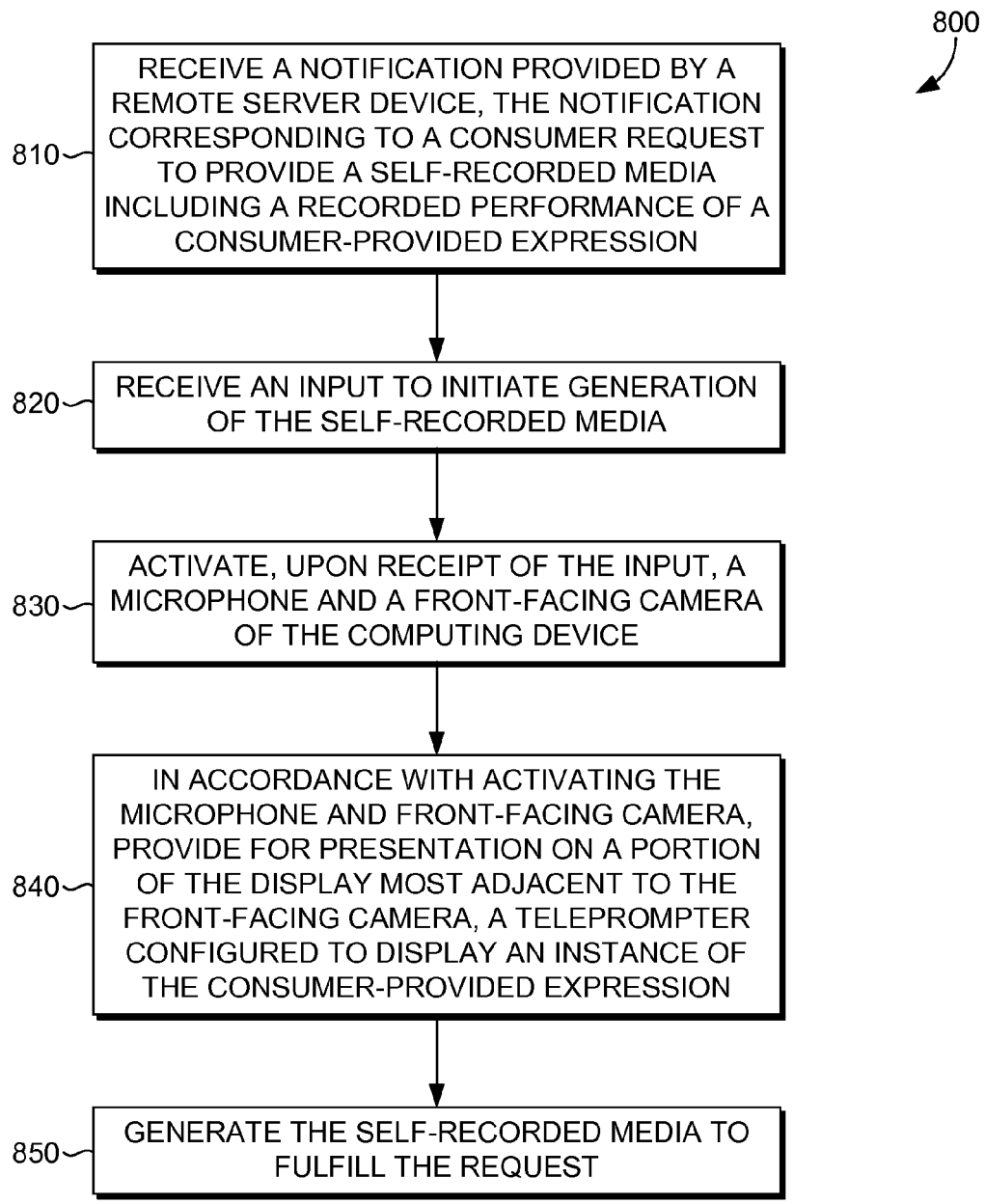
FIG. 8 is a flow diagram showing another exemplary method for facilitating the generation and exchange of custom self-recorded media, in accordance with embodiments described herein.

Turning now to FIG. 8, a flow diagram is provided that illustrates a method 800 for facilitating an exchange and delivery of custom self-recorded media. Initially, at block 810, a notification provided by a remote server device is received. The notification can correspond to a consumer request to provide a self-recorded media including a recorded performance of a consumer-provided expression. At block 820, an input to initiate generation of the self-recorded media is received. At block 830, upon receipt of the input to initiate generation of the self-recorded media, a microphone and front-facing camera of the computing device is activated. At block 840, in accordance with activating the microphone and front-facing camera, a teleprompter configured to display an instance of the consumer-provided expression is provided for presentation on a portion of the display most adjacent to the front-facing camera. At block 850, the self-recorded media is generated to fulfill the request. The self-recorded media is a recording of inputs provided by the microphone and the front-facing camera and includes the recorded performance of the consumer-provided expression.

Figure 9:
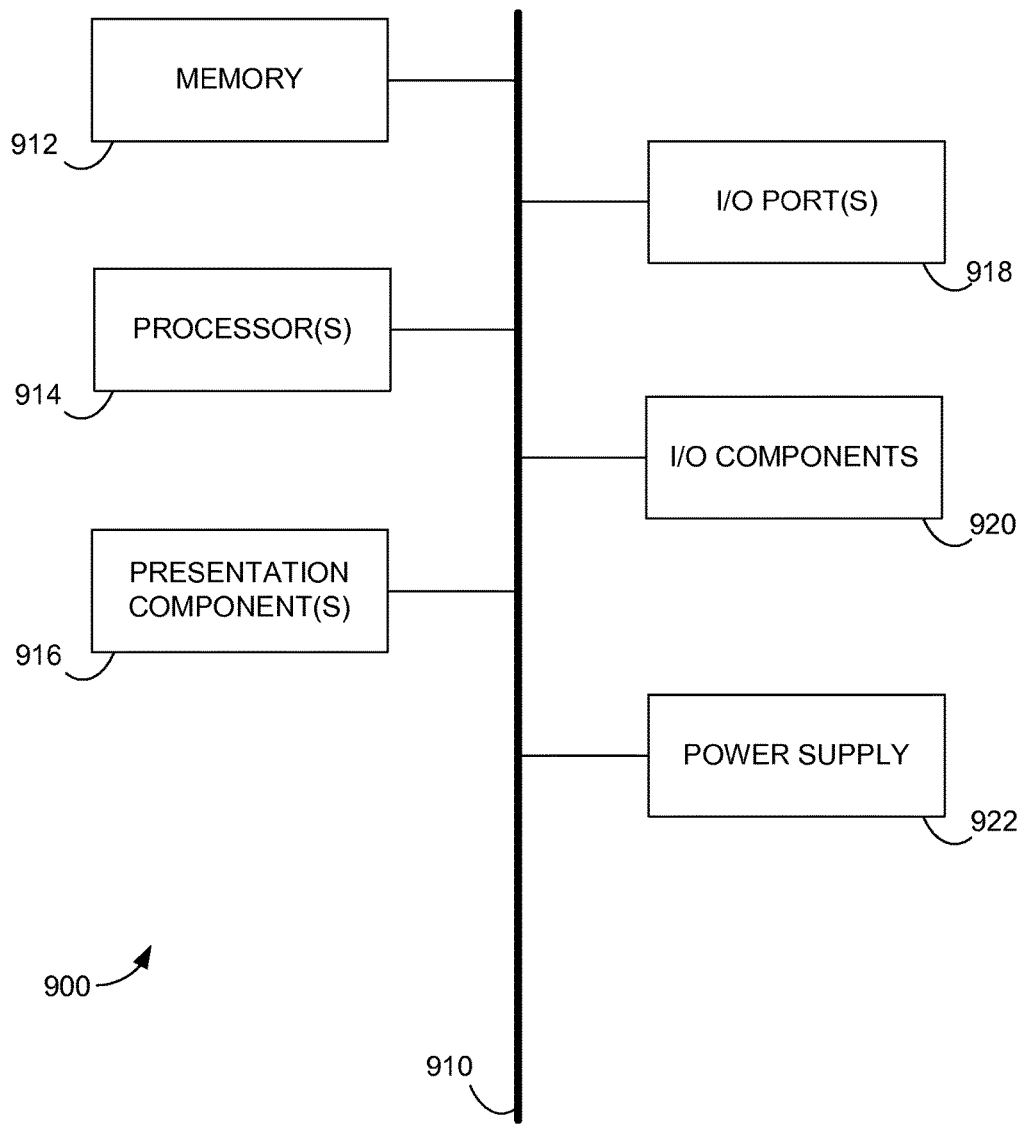
FIG. 9 is a block diagram of an exemplary computing device in which embodiments of the invention may be employed.

Having described embodiments of the present invention, an exemplary operating environment in which embodiments of the present invention may be implemented is described below in order to provide a general context for various aspects of the present invention. Referring initially to FIG. 9 in particular, an exemplary operating environment for implementing embodiments of the present invention is shown and designated generally as computing device 900. Computing device 900 is but one example of a suitable computing environment and is not intended to suggest any limitation as to the scope of use or functionality of the invention. Neither should the computing device 900 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including handheld devices, consumer electronics, general-purpose computers, more specialty computing devices, etc. The invention may also be practiced in distributed computing environments where tasks are performed by remote-processing devices that are linked through a communications network.

With reference to FIG. 9, computing device 900 includes a bus 910 that directly or indirectly couples the following devices: memory 912, one or more processors 914, one or more presentation components 916, input/output (I/O) ports 918, input/output (I/O) components 920, and an illustrative power supply 922. Bus 910 represents what may be one or more busses (such as an address bus, data bus, or combination thereof). Although the various blocks of FIG. 9 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterates that the diagram of FIG. 9 is merely illustrative of an exemplary computing device that can be used in connection with one or more embodiments of the present invention. Distinction is not made between such categories as "workstation," "server," "laptop," "handheld device," "wearable device," etc., as all are contemplated within the scope of FIG. 9 and reference to "computing device."

Computing device 900 typically includes a variety of computer-readable media. Computer-readable media can be any available media that can be accessed by computing device 900 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 900. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 912 includes computer storage media in the form of volatile and/or nonvolatile memory. The memory may be removable, non-removable, or a combination thereof. Exemplary hardware devices include solid-state memory, hard drives, optical-disc drives, etc. Computing device 900 includes one or more processors 914 that read data from various entities such as memory 912 or I/O components 920. Presentation component(s) 916 present data indications to a user or other device. Exemplary presentation components include a display device, speaker, printing component, vibrating component, etc.

I/O ports 918 allow computing device 900 to be logically coupled to other devices including I/O components 920, some of which may be built in. Illustrative components include a microphone, joystick, game pad, satellite dish, scanner, printer, wireless device, etc. The I/O components 920 may provide a natural user interface (NUI) that processes air gestures, voice, or other physiological inputs generated by a user. In some instance, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 900. The computing device 900 may be equipped with depth cameras, such as stereoscopic camera systems, infrared camera systems, RGB camera systems, and combinations of these for gesture detection and recognition. Additionally, the computing device 900 may be equipped with accelerometers or gyroscopes that enable detection of motion. The output of the accelerometers or gyroscopes may be provided to the display of the computing device 900 to render immersive augmented reality or virtual reality.

As can be understood, embodiments of the present invention provide for, among other things, facilitating the generation and delivery of custom self-recorded videos. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A non-transitory computer storage medium storing computer-useable instructions that, when used by one or more computing devices, cause the one or more computing devices to perform operations to facilitate an exchange of requested custom media comprising:
    receiving a notification, from a remote server device, indicative of a new request, wherein the notification is received based at least in part on the new request, including a custom expression, having been sent from a remote client device to the remote server device, wherein the new request is directed to a corresponding profile;
    activating a microphone and a front-facing camera based at least in part on the received notification, wherein the activation instantiates a live video feed provided by the activated front-facing camera;
    providing for display, as an overlay to at least a portion of the instantiated live video feed displayed on a display, a virtual teleprompter that presents the custom expression included in the new request sent from the remote client device, wherein the custom expression is positioned at a portion of the display adjacent to the front-facing camera to facilitate an appearance of eye-contact as a piece of custom media is generated; and
    generating a piece of custom media based at least in part on the custom expression being presented via the displayed virtual teleprompter, wherein the piece of custom media includes data received from the activated microphone and front-facing camera, and is generated for communication to the remote server device as a response to the new request.

2. The medium of claim 1, wherein the notification includes one of a push notification, a SMS message, and an email.

3. The medium of claim 1, wherein the notification is received based further in part on the new request being sent from the remote client device in accordance with the corresponding profile having been selected thereby.

4. The medium of claim 3, wherein the corresponding profile is associated with a corresponding fee.

5. The medium of claim 4, wherein the notification is received based further in part on a confirmation that electronic payment information associated with the new request has been received.

6. The medium of claim 1, wherein the notification is received based further in part on a determination that an away mode status associated with a corresponding profile is defined as disengaged.

7. The medium of claim 6, the operations further comprising:
providing for display an away mode control interface to modify the away mode status associated with the corresponding profile, wherein the away mode status is maintained on the remote server device; and
causing, in response to an input received by the displayed away mode control interface, a webpage hosted on the remote server device to include the corresponding profile.

8. The medium of claim 7, wherein the indication indicates that the away mode status is defined as disengaged.

9. A computer-implemented method for facilitating an exchange of requested custom media, the method comprising:
receiving, by a computing device and from a remote server device, a notification indicative of a new request, wherein the notification is received based at least in part on the new request having been sent from a remote client device to the remote server device, wherein the new request includes a custom expression and is directed to a profile associated with the computing device;
activating, by the computing device based at least in part on the received notification, a microphone and a front-facing camera of the computing device, wherein the activated front-facing camera provides a live video feed for display on the computing device;
providing for display, by the computing device, an overlay to the instantiated live video feed that includes a virtual teleprompter presenting the custom expression included in the new request; and
generating, by the computing device, based at least in part on the custom expression being presented via the virtual teleprompter, a piece of custom media for communication to the remote server device as a response to the new request.

10. The computer-implemented method of claim 9, wherein the notification is received based further in part on a determination that an away mode status associated with a corresponding profile is defined as disengaged.

11. The computer-implemented method of claim 10, further comprising:
providing for display, by the computing device, an away mode control interface that modifies the away mode status associated with the corresponding profile in response to a received input; and
causing, by the computing device in response to the received input, a webpage hosted by the remote server device to dynamically update and include the corresponding profile.

12. The computer-implemented method of claim 9, wherein the overlay to the instantiated live video feed is positioned at a portion of a display nearest the front-facing camera to facilitate an assumed eye-contact during the generation of the piece of custom media.

13. The computer-implemented method of claim 9, further comprising:
establishing verified access to the remote server device based at least in part on a determination that the corresponding profile is associated with a verified third-party social media account on a third-party social media platform.

14. The computer-implemented method of claim 13, wherein the corresponding profile is associated with the verified third-party social media account based on a verification process that includes a successful login to the verified third-party social media account on the third-party social media platform.

15. The computer-implemented method of claim 14, wherein the verified third-party social media account on the third-party social media platform includes an indication, provided by the third-party social media platform, that the social media account is verified authentic.

16. A mobile device comprising:
at least one processor; and
at least one computer storage media storing computer-usable instructions that, when used by the at least one processor, cause the at least one processor to:
receive a notification sent by a remote server device to the mobile device based at least in part on a new request having been sent from a remote client device to the remote server device, wherein the new request is directed to a profile associated with the mobile device, and wherein the new request includes a custom expression;
activate, by the mobile device based at least in part on the received notification, a microphone and a front-facing camera of the mobile device, wherein the activated front-facing camera provides for display a live video feed;
provide for display, on a display of the mobile device, an overlay on at least a portion of the displayed live video feed, wherein the overlay includes a virtual teleprompter that presents the custom expression included in the new request, and wherein the presented custom expression is positioned at a portion of a display nearest the front-facing camera to facilitate an appearance of eye-contact as a piece of custom media is generated; and
generate, by the mobile device, based at least in part on the custom expression being presented via the virtual teleprompter, the piece of custom media for communication to the remote server device and as a response to the new request.

17. The mobile device of claim 16, wherein the instructions further cause the at least one processor to:
display, on the display of the mobile device, an away mode control interface to modify an away mode status associated with the corresponding profile, wherein the away mode status is maintained on the remote server device; and
cause, by the mobile device and in response to an input received by the displayed away mode control interface, a dynamic update to a webpage hosted on the remote server device, wherein the dynamic update includes a change to an availability status corresponding to the away mode status associated with the corresponding profile.

18. The mobile device of claim 16, wherein the notification is received based further in part on an approval to the new request having been sent from another remote client device to the remote server device.

19. The mobile device of claim 16, wherein the instructions further cause the at least one processor to:
   generate a first graphical user interface (GUI) for display on the display of the mobile device, the first GUI presenting an order queue that is updated to include at least a portion of the new request; and
   based on a received selection corresponding to at least the portion of the new request, generate a second graphical user interface (GUI) for display on the display of the mobile device, the second GUI including a detailed overview of the new request.

20. The mobile device of claim 16, wherein the generated piece of custom media is communicated to the remote server device in response to a received command to approve the generated piece of custom media as the response to the new request.

* * * * *